Oct. 18, 1927.  1,645,888
O. ZERK, NOW BY JUDICIAL CHANGE OF NAME O. U. ZERK
LUBRICANT DISPENSING APPARATUS
Filed July 5, 1923
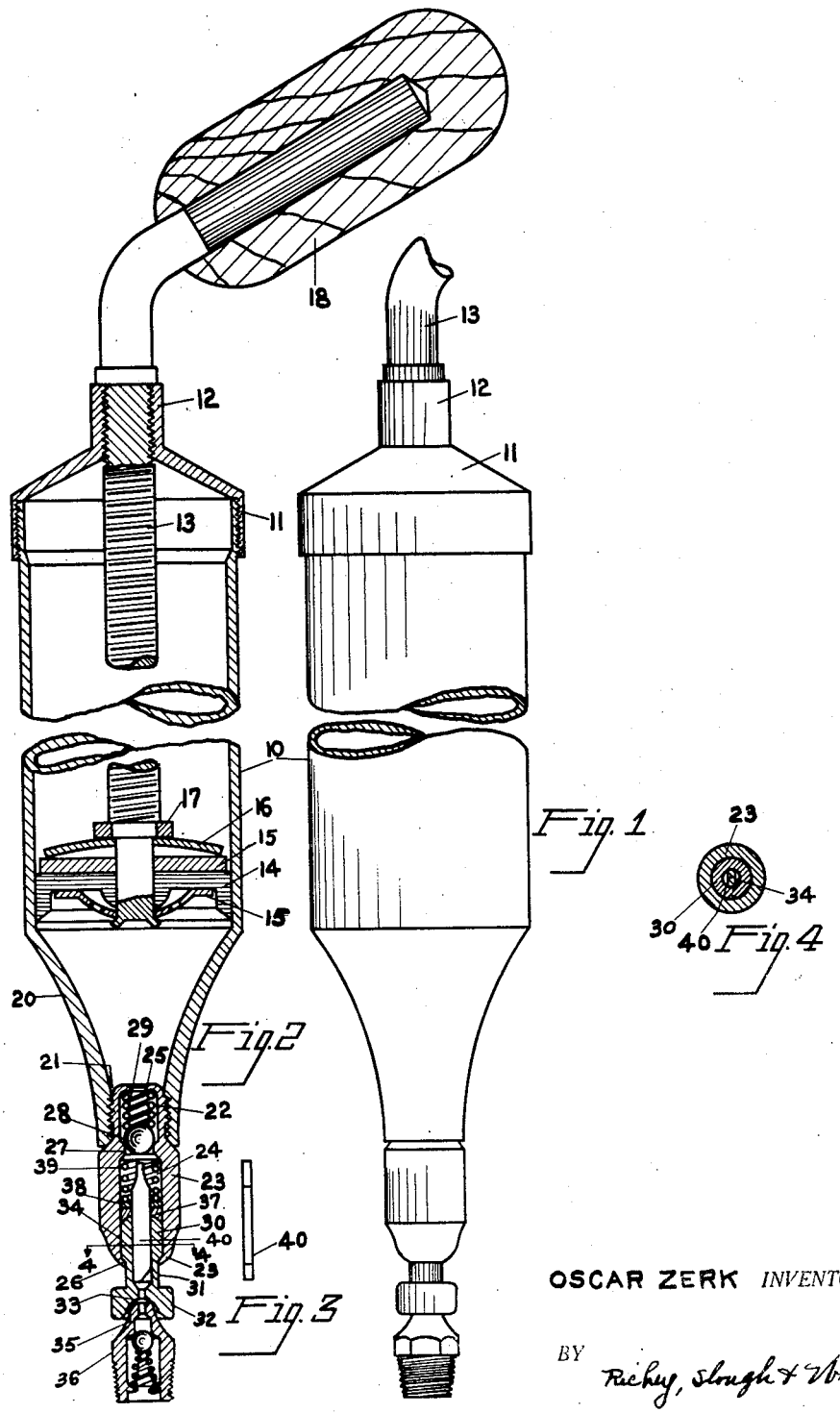
OSCAR ZERK INVENTOR.
BY Richey, Slough & Watts.
HIS ATTORNEYS

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICANT-DISPENSING APPARATUS.

Application filed July 5, 1923. Serial No. 649,706.

This invention relates to lubricating systems and more particularly to the outlet conduit of a dispensing apparatus, and to the manner of controlling the flow of lubricant therethrough.

An object of my invention is to provide an outlet nozzle which is removably secured to a lubricant container.

Another object of my invention is to provide a lubricant dispensing apparatus with an outlet nozzle having a valve therein, which is engaged and unseated by the longitudinal sliding movement of a connector relative thereto.

Another object of my invention is to provide a dispensing apparatus in which an outlet nozzle is secured to a container and carries a connector which is slidable relative thereto, the outlet nozzle and the connector having communicating passages therethrough and the connector having means to open a valve in the passage in the nozzle when it is moved inwardly thereagainst.

Another object of my invention is to provide a unitary outlet conduit structure which is detachably secured to a container and consists of a nozzle, a sliding connector, a valve, and valve operating means, which are arranged so that inward movement of the connector will engage and unseat the valve while maintained in contact therewith.

These and other objects will appear hereinafter.

In the drawings Figure 1 is a side elevation of the lubricating system including lubricant dispensing apparatus in operative contact with a nipple; Fig. 2 is a section through the same; Fig. 3 is a side elevation of the valve operating pin removed from the apparatus; and Fig. 4 is a section through the nozzle, connector and valve operating pin taken on line 4—4 of Fig. 2.

Referring to the drawings by characters of reference 10 represents a cylindrical lubricant container, upon one end of which is screwed a cap 11. This cap is provided with an elongated internally threaded neck 12 through which a piston rod 13 is screwed. A plunger 14 is slidably retained upon the reduced inner end of the piston rod, and washers 15 are provided on each side thereof. A spring follower 16 is mounted upon the piston rod, being seated between a washer 17 which is pressed upon the piston rod, and the upper washer 15. The inner end of the piston rod is upset to retain the spring, washers and plunger thereon, and the outer end of the piston rod is provided with a handle 18, by means of which the plunger is moved to create pressure against the lubricant within the container.

The outlet end 20 of the container is tapered and provides a reduced outlet orifice 21. The inner wall of the outlet end of the container is threaded and receives the reduced exteriorly threaded end 22 of the outlet nozzle 23. A passage 24 extends longitudinally through the nozzle and is in open communication with the interior of the lubricant container. The ends of the nozzle are turned inwardly forming flanges 25 and 26, which partially enclose the passage therein. A shoulder 27 projects into the passage intermediate its ends and forms a seat against which the ball 28 engages to form a valve closure for the passage. A coil spring 29 extends between the ball and the flange 25 within the passage, and exerts sufficient pressure against the ball to normally close the passage at the valve seat.

A connector 30 is slidably secured within the outer end of the passage in the nozzle, by the flange 26 which encircles a reduced portion 31 thereof. The inner end of the connector is of substantially the same diameter as the passage in the nozzle, and the outer end of the connector which projects from the nozzle is provided with a head 32 having a semi-spherical recess 33 in the end thereof. A circular passage 34 extends longitudinally through the connector and provides a conduit for feeding lubricant to the nipple. The recess 33 is adapted to fit over the apertured contact end 35 of the nipple 36, to form a leak proof universal joint therewith, which is maintained by manual pressure when the connector is placed against the nipple. The shape of the recess permits the apparatus to be held in a plurality of angles relative to the nipple, and maintain leak proof contact therewith.

A packing ring 37, having a central aperture therein, fits against the inner end of the connector within the passage in the nozzle to prevent leakage of lubricant between the nozzle and connector, and is maintained in such position by a washer 38 against which a coil spring 39 bears. The coil spring at its other end abuts the lower side of the valve seat 27 within the passage, and the pressure of the spring is transmitted to the connector, normally maintaining it in extended relation to the nozzle. The packing ring has a depending beveled flange which engages the side of the nozzle and seats over the beveled inner end of the connector.

A flat pin 40 is secured in and projects from the circular passage 34 in the connector through the circular apertures in the packing ring and the washer and into the passage 24 of the nozzle, permitting lubricant to flow through these passages on each side of the pin. The inner end of the pin is normally below the ball 28, when the connector is in normal extended postion, and will engage the ball, holding it unseated from the valve seat, when the container moves toward the outer end of the connector. This action takes place when contact is formed between the nipple and the connector, and pressure is applied against the handle 18, whereby the nozzle will slide upon the connector toward the nipple.

Pressure may be applied to the grease within the container either before or after contact between the connector and nipple is made, and in either case when longitudinal axial pressure is applied to the apparatus, the ball moves against the pin providing an open conduit from the container through the passages in the nozzle and connector, so that lubricant can be forced from the container through the aperture in the nipple.

The nozzle carries the connector and valve mechanism, and they are both removable from the container with the nozzle. Ready access may be had to the outlet end of the container by unscrewing the nozzle, and the container may be filled with lubricant either through the outlet end when the nozzle is removed, or through the opposite end when the cap and plunger are removed.

Various changes may be made in the details of construction shown and described without departing from the spirit of my invention, or the scope of the claims.

What I claim is:—

1. A lubricant dispensing nozzle comprising a sleeve having a bore, said sleeve having integral annular projections extending into said bore at both ends and another projection intermediate the ends, said sleeve having an externally threaded inlet end and a discharge end, an inwardly opening check valve seated on said intermediate projection, a spring holding said valve seated and abutting the projection at the inlet end, an axially slidable discharge connector having a reduced portion extending out through the projection at the discharge end, a packing gasket in said bore riding on the inner end of said connector, spring means seated on said intermediate projection in said bore for compacting said gasket and holding said connector extended, said connector having an axial bore with an inwardly facing shoulder, a flat pin in said bore projecting inwardly to open said check valve when said discharge connector is pressed in, and means on the outer end of said connector for forming a contact seal under axial thrust.

2. A lubricant dispensing nozzle comprising a sleeve having a bore, said sleeve having integral annular projections extending into said bore at both ends and another projection intermediate the ends, said sleeve having an externally threaded inlet end and a discharge end, an inwardly opening check valve seated on said intermediate projection, a spring holding said valve seated and abutting the projection at the inlet end, an axially slidable discharge connector having a reduced portion extending out through the projection at the discharge end, said connector having an axial bore with an inwardly facing shoulder, a flat pin in said bore projecting inwardly to open said check valve when said discharge connector is pressed in, and means on the outer end of said connector for forming a contact seal under axial thrust.

3. A lubricant dispensing nozzle comprising a sleeve having a bore, an inlet end and a discharge end, said sleeve having an integral annular projection extending into said bore at the discharge end, an axially slidable discharge connector having a reduced portion extending out through the projection at the discharge end, spring means in said bore holding said connector extended, said connector having an axial bore, and means on the outer end of said connector for forming a contact seal under axial thrust, said projection being formed by inward deformation of the material at the end of said sleeve after said spring means and connector have been assembled.

4. A unitary lubricant dispensing nozzle comprising a sleeve having a bore, said sleeve having an externally threaded inlet end and a discharge end, an inwardly opening check valve housed in said sleeve, an axially slidable discharge connector in said bore separate from said valve, said connector having a reduced portion extending out at the discharge end, spring means in said bore holding said connector extended, means on the outer end of said connector for forming a contact seal under axial thrust, and a turned-in lip at the discharge end of said bore, sliding on the reduced portion of said connector and limiting its outward movement.

5. A lubricant dispensing nozzle comprising a sleeve having a bore, an inwardly opening check valve in said bore, an axially slidable discharge connector, said connector having an axial bore and an inwardly facing shoulder in said bore, and a flat pin in said bore abutting said shoulder and projecting inwardly to open said check valve when said discharge connector is pressed in.

In testimony whereof, I have hereunto affixed my signature this 3d day of July, A. D., 1923.

OSCAR ZERK.